United States Patent Office 2,846,181
Patented Aug. 5, 1958

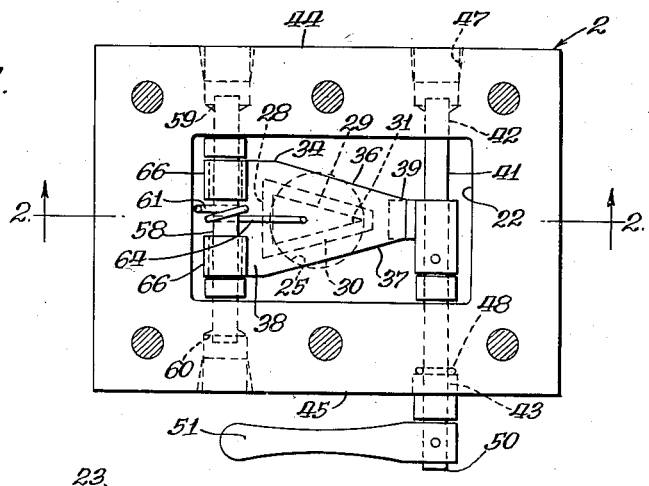

2,846,181

HYDRAULIC DIAPHRAGM VALVE

John R. Orelind, Wilmette, and Vinson R. Simpson, Sr., Forest Park, Ill., assignors to International Harvester Company, a corporation of New Jersey Application June 3, 1955, Serial No. 512,928

2 Claims. (Cl. 251—259)

This invention relates to hydraulic valves and more specifically to an hydraulic diaphragm valve.

A general object of the invention is to provide a simple valve which requires a minimum of effort to open.

A more specific object of the invention is to provide a novel valve incorporating a valve body which provides a high pressure chamber which is connected to a high pressure line and a discharge port communicating with the high pressure chamber and adapted to be closed by a valve member which comprises a flexible spring steel plate hinged at one side of the discharge port and seated on a seat which is provided at the inlet end of the discharge port and the plate being bendable in order to crack open a passage from the high pressure chamber to the discharge port in order to relieve the pressure in the high pressure chamber and thereby permit opening the valve plate or unseating it from the seat with relatively small effort.

These and other objects of the invention will become more apparent from the specification and the drawings, wherein:

Figure 1 is a sectional view of the valve taken substantially on the line 1—1 of Figure 2;

Figure 2 is a diagrammatic view of an hydraulic circuit incorporating the valve and the valve being shown in section substantially on the line 2—2 of Figure 1;

Figure 3 is a sectional view on line 3—3 of Figure 2; and

Figure 4 is a fragmentary perspective view of a modified form of the valve plate.

Describing the invention in detail, the valve generally designated 2 may be incorporated in an hydraulic circuit which may comprise a reservoir 3 to which is connected the suction side 4, through a pipe 5, an hydraulic pump 6 which has its discharge side connected to a high pressure line 7 which may be connected through a relief valve 8 and the conduit 9 to the reservoir 3.

The high pressure line 7 may be connected to an inlet port 10 in the valve body generally indicated 11. The high pressure port 10 communicates with a high pressure chamber 12. The valve body herein shown is constituted of three members, namely, a center portion 13 and end members 14 and 15 which are clamped together, as shown in Figure 2, and are provided at their internal sides 16 and 17, respectively, with substantially flat peripheral edges 18 and 19, respectively, which seat and are cemented against the opposed edges 20 and 21 of the center portion 13 which is cut out centrally with a rectangular opening 22 in order to provide, with the beforementioned members 14 and 15, the said high pressure chamber 12. The members 14 and 15 are clamped together by means of a plurality of bolts 23 which are threaded as at 24 into the end member 15.

The end member 15 is provided with an outlet or discharge port or opening 25 which at its inner end 26 is surrounded by a valve seat generally indicated 27 and herein illustrated as a shoulder in the form of an isosceles triangle including a base portion 28 and sides 29 and 30 which converge to a point or apex 31 which is directed transaxially of the inner end 26 of the discharge or outlet opening. The seat structure 27 has a flat seating edge 32 against which seats the bottom flat side 33 of a diaphragm or valve plate member generally indicated 34 which includes the main plate portion 35 which may be formed of thin flat spring steel, the plate portion 35 having converging lateral edges 36 and 37 which narrow the width of the plate portion from its base end 38 to its narrow lip end 39 which extends and projects beyond the apex 31 in overhanging relationship to the seat 27 and over a lifting finger 40 which is keyed to a spindle or shaft 41 which is journaled as at 42 and 43 in opposite sides 44 and 45 of the center block 13. The opening 42 is closed by a plug 47 and the opposite end of the shaft where it journals at 43 is provided with a seal 48. The outer end 50 of the shaft 41 has a handle or lever 51 which may be rotated as indicated in phantom lines in Figure 2 in a clockwise direction in order to peel the narrow end 39 of the valve plate 32 from the seat and thereby crack the outlet which communicates through a conduit 53 to an hydraulic motor 54 which exhausts through a conduit 55 into the reservoir 3. It will be readily appreciated that the high pressure in the chamber 12 acts upon that part of the portion 39 of the plate that closes the opening 26 to tightly urge it against the seating edge 32 as initially biased by a torsion spring 57 which has its center spring portion looped about a hinge pin 58. The pin 58 is carried in aligned apertures 59 and 60 in the opposite sides 44 and 45 of the center block portion. The spring 57 has one leg 61 seated as at 62 against an end portion 63 of the center block and the other leg 64 of the spring is seated as at 65 against the top side 56 of the plate portion 39 whereby constantly urging the plate portion downwardly attendant to its swinging about a pair of hinge portions 66 which are spaced axially of the shaft or pin 58 at opposite sides of the spring 57 and which extend upwardly from and formed integral with the base portion 38 of the plate 33. It will be understood that if desired the plate portion 39 may be serrated at its top side by a plurality of transverse slots 75 as shown in Figure 4 to increase its flexibility. However, it is believed that the basic principle of the invention resides in the provision of a flexible member which may be peeled off one edge of the valve seat in order to reduce the pressure in the valve chamber and thus permit continued opening of the valve plate with minimum force.

It will be understood that although the plate herein shown is of spring metal it may be of any other material such as plastics of sufficient strength to withstand the pressures involved and characterized by an ability to deflect to conform to the seating surface and be bendable to peel off the seat.

What is claimed is:

1. In a valve having a body with a high pressure chamber and inlet and outlet ports communicating with said chamber, a raised seat about said outlet port substantially in the form of an isosceles triangle, a spring metal valve plate having a generally triangular portion seated upon said seat in the closed position of said valve, said portion having a tapered end overhanging a corresponding corner of said seat and having a base opposite said end, means pivotally mounting said plate at said base for swinging movement toward and away with respect to said seat, means for lifting said plate off said seat comprising a finger disposed in underposed relation to said tapered end and operative upon actuation thereof to peel said plate off said seat by bending said plate to crack open the adjacent corner to relieve the pressure acting on the side of said plate immediately opposite the adjacent portion of said seat to accommodating swinging said plate off said seat with minimum effort against the resistance of pressure fluid in said chamber.

2. In a valve having a body with a high pressure chamber and inlet and outlet ports communicating with said chamber, a triangular seat about said port, a spring metal valve plate having a generally triangular portion seated upon said seat in the closed position of said valve, said portion having a tapered end overhanging a corresponding corner of said seat and having a base opposite said end, means pivotally mounting said plate at said base for swinging movement toward and away with respect to said seat, means for lifting said plate off said seat comprising a finger disposed in underposed relation to said tapered end and operative upon actuation thereof to peel said plate off said seat by bending said plate to crack open the adjacent corner to relieve the pressure acting on the side of said plate immediately opposite the adjacent portion of said plate off said seat with minimum effort against the resistance of pressure fluid in said chamber.

References Cited in the file of this patent

UNITED STATES PATENTS

| | | |
|---|---|---|
| 2,030,121 | Sillers | Feb. 11, 1936 |
| 2,378,613 | Young | June 19, 1945 |
| 2,512,694 | Stout | June 27, 1950 |
| 2,700,980 | Andrews | Feb. 1, 1955 |
| 2,738,948 | Barnes | Mar. 20, 1956 |

FOREIGN PATENTS

| | | |
|---|---|---|
| 366,253 | Great Britain | of 1932 |
| 728,628 | France | of 1932 |